US 8,316,221 B2

(12) United States Patent
Daemen et al.

(10) Patent No.: US 8,316,221 B2
(45) Date of Patent: Nov. 20, 2012

(54) RECORDING OF A KEY IN AN INTEGRATED CIRCUIT

(75) Inventors: Joan Daemen, Overpelt (BE); Thierry Huque, Hannut (BE); Paul Fontaine, Winksele (BE)

(73) Assignee: Proton World International N.V., Zaventem (BE)

( * ) Notice: Subject to any disclaimer, the term of this patent is extended or adjusted under 35 U.S.C. 154(b) by 893 days.

(21) Appl. No.: 11/658,480

(22) PCT Filed: Jul. 22, 2005

(86) PCT No.: PCT/EP2005/053574
§ 371 (c)(1),
(2), (4) Date: Nov. 10, 2008

(87) PCT Pub. No.: WO2006/013162
PCT Pub. Date: Feb. 9, 2006

(65) Prior Publication Data
US 2009/0067630 A1    Mar. 12, 2009

(30) Foreign Application Priority Data

Jul. 26, 2004    (FR) ..................................... 04 51657

(51) Int. Cl.
*G06F 15/04*    (2006.01)
(52) U.S. Cl. ............. 713/1; 713/171; 713/172; 380/273; 380/279; 380/283
(58) Field of Classification Search ............... 713/1, 171, 713/172; 380/273, 279, 283
See application file for complete search history.

(56) References Cited

U.S. PATENT DOCUMENTS

| 4,811,393 | A |   | 3/1989 | Hazard |
| 5,495,098 | A |   | 2/1996 | Pailles et al. |
| 5,841,866 | A | * | 11/1998 | Bruwer et al. .................. 705/66 |
| 6,317,832 | B1 | * | 11/2001 | Everett et al. .................. 713/172 |
| 7,305,555 | B2 | * | 12/2007 | Okimoto et al. ............... 713/168 |
| 7,726,577 | B2 | * | 6/2010 | Nakabe et al. .................. 235/492 |
| 2002/0107798 | A1 |   | 8/2002 | Hameau et al. |
| 2003/0145203 | A1 |   | 7/2003 | Audebert et al. |
| 2003/0212894 | A1 |   | 11/2003 | Buck et al. |
| 2004/0006695 | A1 | * | 1/2004 | Ishibashi et al. ............... 713/175 |

FOREIGN PATENT DOCUMENTS

EP    0 440 800 A1 *  8/1991
FR    2 681 165 A       3/1993

OTHER PUBLICATIONS

International Search Report from corresponding International Application No. PCT/EP2005/053574 filed Jul. 22, 2005.

* cited by examiner

*Primary Examiner* — Eleni Shiferaw
*Assistant Examiner* — Paul Callahan
(74) *Attorney, Agent, or Firm* — Wolf, Greenfield & Sacks, P.C.

(57) ABSTRACT

A method and a system for personalizing electronic elements, by replacing, in a non-volatile memory of each of the electronic elements a first secret key with a second secret key, by a secure authentication module automatically generating the second key after having restored the first one from an identifier of the element being personalized, including conditioning, on the authentication module side, the provision of the second key to a current element to the reception of a message confirming the key replacement of at least one preceding element.

15 Claims, 2 Drawing Sheets

RECORDING OF A KEY IN AN INTEGRATED CIRCUIT

1. FIELD OF THE INVENTION

The present invention generally relates to the field of integrated circuits manipulating secret keys, be it to cipher data to be communicated to the outside of the circuit or to authorize an access to applications.

The present invention more specifically relates to the use of a secret key specific to an integrated circuit during installation of applications (programs) in the circuit.

The present invention applies, for example to smart cards which, after manufacturing, are personalized, not by the manufacturer, but by the provider of the application (transport system, bank, etc.). In practice, a smart card comes out of manufacturing with a (native) key which is specific thereto, stored in a non-volatile memory. This key is used in a so-called personalization phase to authenticate the card when an application provider wants to transfer information, for example, into it, and to cipher the exchanges in this personalization phase until transfer, into the non-volatile memory of the card, of a new secret key linked to the application.

2. DISCUSSION OF THE RELATED ART

Generally, the personalization implements a symmetrical ciphering process, that is, with a shared secret key of the two elements communicating together (the card to be personalized and the personalization module). The personalization module must thus know or be able to restore the secret key of any chip that it is meant to personalize. In practice, the personalization module has, in its memory, a so-called master key which enables it to restore, from an identifier of a chip, the secret key thereof. It then uses this restored key to sign (cipher) the control signals that it sends to the chip and, especially, the program writings or the application keys. At the end of a personalization, the module replaces the native key of the chip with another secret key. For the card to accept the replacement, in its non-volatile memory, of its native secret key by this new secret key, it must be transmitted thereto with the old key. Once the secret key has been replaced, the native key can no longer be used.

The smart card personalization is a phase particularly sensitive to attacks aiming at discovering the secret keys, since the knowledge of a master key generally enables pirating an entire batch of cards or fraudulently personalizing other cards.

A first known personalization technique consists of placing each chip in a reader dedicated to the application provider. It is then spoken of a personalization in a host security module (HSM). This personalization technique poses in principle no problem since the personalization module is secure, that is, it cannot be pirated, be it from the point of view of its master key or from the point of view of its key restoring algorithm.

However, more and more often, the personalization is performed in versatile readers (not dedicated to a given application). The application provider is then identified by means of a so-called master smart card introduced into this reader to allow it to intervene on a given chip batch. This technique is known as a secure application module (SAM), the master card forming this module. Such a technique weakens the personalization phase from the point of view of possible frauds since the master smart cards are piratable.

A usual piracy technique consists of causing errors (fault injection) in the execution of the ciphering algorithm executed by the master card. Based on a statistical analysis of the card behavior and especially on its power consumption, the pirate succeeds in discovering the card's secret.

Now, the risk for slave cards is significant in case of a fraud. Indeed, if a pirate succeeds in discovering the secret (the key(s)) of a master card, there exists no other solution than withdrawing (calling in) all the cards which have been previously personalized with this secret to block the use of cards which would be fraudulently personalized with the pirated master key. Current systems are indeed not capable of then making the difference between a good and a false slave card.

FIG. 1 very schematically shows an example of a known system of personalization of smart card keys by a master card. Such a system implements a master key Km, specific to the application provider, for example, contained in chip 4 of a master card 1. Key Km is used to restore secret keys Ks of chips 5 of a batch of slave cards 2 to transfer an application program or any other critical information thereto. The two cards communicate (arrows in FIG. 1) via a module or reader 3 considered as secure, that is, in which the information exchanges are considered as non-piratable.

At the end of the personalization phase, cards 2 contain one or several keys Ks' dedicated to the applications that they are likely to implement and which replace native key Ks. After, in the use of the smart card, authentication processes check the validity of key Ks'.

To limit frauds, several techniques are conventionally implemented. A first technique consists of using specific keys by a personalization session to make a pirated key unusable in another personalization session. Such a technique is however not usable in the case of master smart cards (case where the SAM is formed of a smart card) since said cards then integrate a master key Km which is thus always the same for a given card.

A second known technique consists of a ratification procedure. It consists of using a counter which is incremented each time master key Km is used. The use of key Km is then blocked after a number of uses to restore the secret keys. The limiting number is selected to be smaller than the number required to pirate a key by statistical analyses. This technique requires a significant effort to implement. Further, if it is desirable for the security mechanism to avoid the personalization of fraudulent cards by using a pirated master key, it is not desirable for it to block an industrial personalization system by limiting the validity (in number of uses) of a master card in the absence of a piracy attempt.

Accordingly, current protection systems are not satisfactory for personalization systems of secure application module (SAM) type using master smart cards.

SUMMARY OF THE INVENTION

The present invention aims at overcoming the disadvantages of known methods.

The present invention especially aims at personalizing keys in electronic elements (for example, smart cards).

The present invention also aims at providing a solution compatible with the use of smart cards by way of secure application modules.

To achieve these and other objects, the present invention provides a method for personalizing electronic elements, by replacing in a non-volatile memory of each of them a first secret key with a second secret key, by means of a secure authentication module automatically generating said second key after having restored the first one from an identifier of the element being personalized, comprising conditioning, on the authentication module side, the provision of the second key to a current element to the reception of a message confirming the key replacement of at least one preceding element.

According to an embodiment of the present invention, a module counter totalizes the number of successive confirmation messages not received for preceding elements and compares this number with a stored threshold to allow personalization of the current element, the counter being reset each time a current element confirms the replacement of its key.

According to an embodiment of the present invention, the exchanges between the element and the module are coded by data generated by said module and changing for each new element.

According to an embodiment of the present invention, a same secret key of an electronic element is replaced with several second keys.

According to an embodiment of the present invention, the authentication module is a smart card.

According to an embodiment of the present invention, said element is a smart card.

The present invention also provides a system of key personalization in smart cards.

The foregoing and other objects, features, and advantages of the present invention will be discussed in detail in the following non-limiting description of specific embodiments in connection with the accompanying drawings, in which:

DETAILED DESCRIPTION

Figure 1:
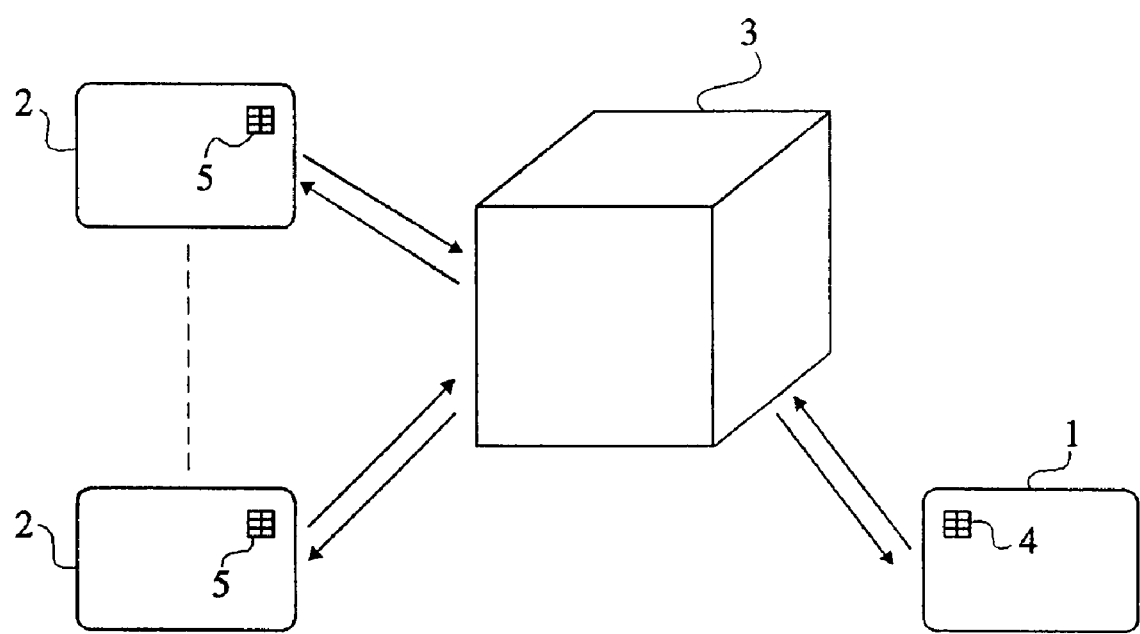
FIG. 1, previously described, is intended to show the state of the art and the problem to solve.

The same elements have been designated with the same reference numerals in the different drawings. For clarity, only those elements and steps which are useful to the understanding of the present invention have been shown and will be described hereafter. In particular, the operations performed in the ciphering or coding steps have not been described in detail when they use processings conventional per se. Further, what use is made of the secret keys provided by the personalization phase has not been described in detail. The present invention is compatible with any conventional subsequent use. Similarly, the structure of a computer personalization reader based on master cards has not been described in detail, the present invention being compatible with any conventional personalization reader. Only the personalization program executed by the reader is specific to the present invention, but requires no structural modification of the reader.

The present invention will be described hereafter in relation with an example of application where the secure application module (SAM) is a smart card integrating (containing in a non-volatile memory) a master key, the symmetrical ciphering algorithm, and the secret key restoring algorithm. It however more generally applies to any SAM-type personalization module, and to any processor of personalization of an electronic element (for example, a smart card) using a native secret key to communicate, by a symmetrical ciphering process, with a secure application module (SAM) of master smart card type.

A feature of the present invention is to condition, on the master card side, the personalization of a current key on reception of a confirmation by a preceding card that its native secret key has effectively been replaced in its non-volatile memory. In other words, the present invention ensures that the card personalization procedure has been completed before allowing personalization of other cards by this same module.

Thus, the master smart card is protected against piracy attempts that disturb its operation by fault injections. Indeed, the pirate will not be able to execute the multiple attempts which are necessary to perform a statistical analysis, the master card being blocked if the preceding personalizations have not been completed. If a pirate succeeds in stealing a master card, he must also steal a batch of slave cards to be personalized, which considerably reduces fraud risks.

However, the master card is not limited in its number of uses if it is not attacked.

On the side of the card to be personalized, the native secret key can only be used once. Indeed, since it is replaced with a new key at the end of the personalization, any attempt to reproduce, even with a slave card, a personalization procedure is deemed to fail.

To implement the present invention, a slave card must contain means for calculating a symmetrical signature (MAC, for Message Authentication Code). This will in practice not be a problem since the smart card is generally provided with a microprocessor to which is it enough to add this function (in hardware and/or software fashion).

Figure 2:
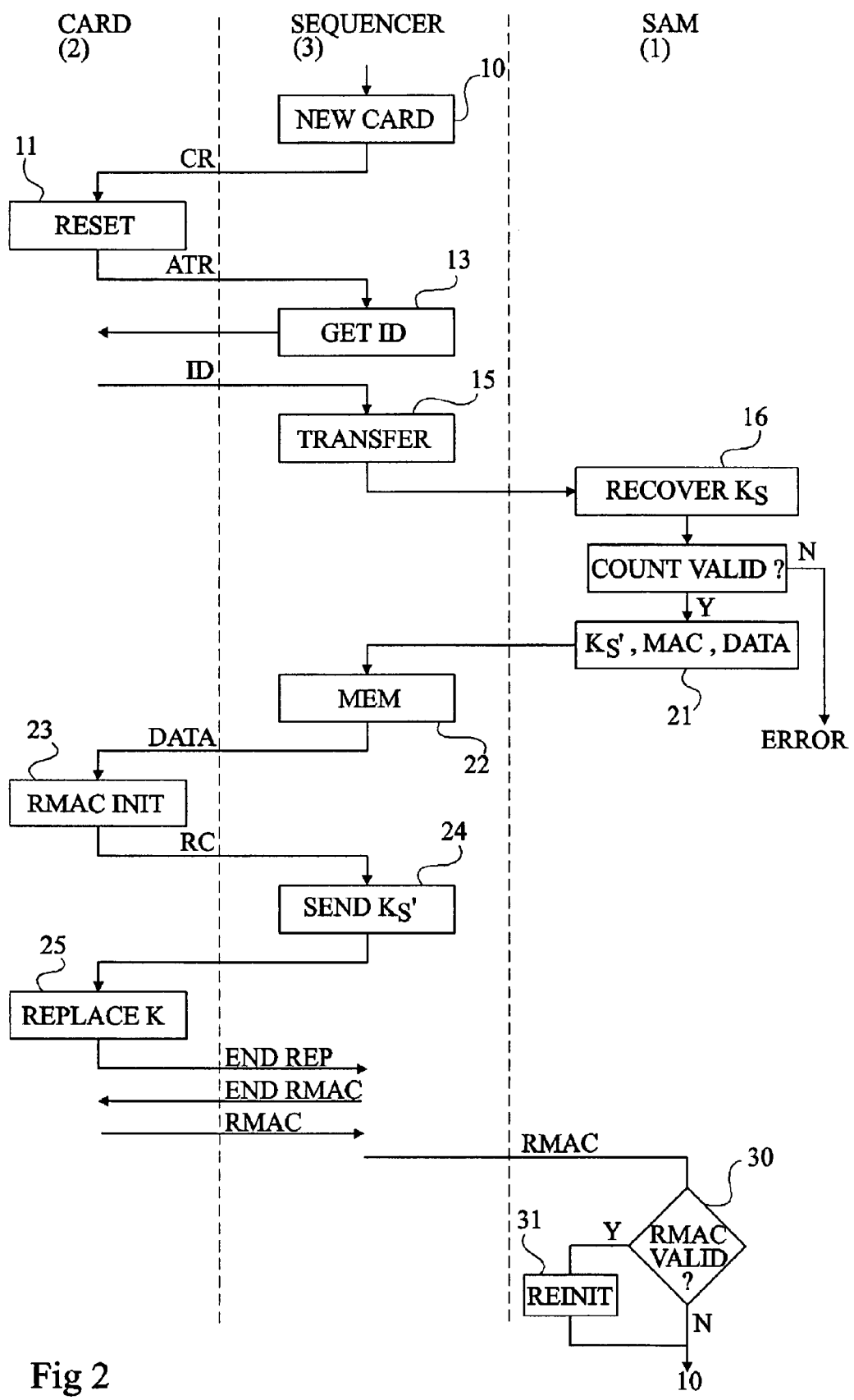
FIG. 2 illustrates an embodiment of the present invention.

FIG. 2 illustrates an embodiment of the method of the present invention. This drawing illustrates the exchanges, via a reader 3 (FIG. 1), between a smart card 2 to be personalized and a master card 1. The operations on the master card side (SAM) are in the right-hand portion of the drawing while the operations on the side of the card to be personalized (CARD) are on the left-hand side. The operations executed by the reader (SEQUENCER) are at the center. The personalization program is, except for the ciphering algorithms and the keys, preferentially contained in reader 3 which has the greatest processing capacity. The master card and the card to be personalized also have means for interpreting control signals which are respectively intended for them.

The personalization method of the present invention will be discussed hereafter in relation with the personalization of a single card. However, the advantage of the present invention lies in the personalization of many slave cards by means of a same master card.

It is assumed that the system has already been initialized and that several cards have already been personalized.

When it detects the introduction of a new card CARD to be personalized (block 10, NEW CARD), reader SEQUENCER sends an electric pulse CR (block 11, RESET) for resetting this card. This step is known as a "cold reset". Independently and conventionally, the reader checks, preferably, on each introduction of a new card CARD, whether master card SAM is still present.

After its resetting, the microprocessor of card 2 selects its so-called basic program. Its sends an answer ATR (Answer To Reset) to the reset. This answer results in indicating to the reader that card 2 is ready to start a personalization procedure.

Reader 3 then reads from the card (block 13, GET ID) a single identifier (ID) such as, for example, a serial number. Card 2 returns identifier ID to the reader. According to a specific example, the identifier reading is performed via a so-called CPLC (Card Production Life Cycle) data request especially containing this single identifier of the card.

Identifier ID is transmitted (block 15, TRANSFERT) by the reader to the SAM card (possibly in ciphered fashion).

Based on identifier ID, the microprocessor of card 1 derives (for example, by reading of a table from the memory), from the master key that it contains in the non-volatile memory, secret key Ks of card 2 (block 16, RECOVER Ks). It is thus now able to cipher the information that it sends to card 2 being personalized.

The above-described steps correspond to the conventional operation of initialization of a personalization by recovery, on the master card side, of the secret key of the card to be personalized.

According to the present invention, the master card then generates (block 21, Ks' DATA) for transmission to the reader a new secret key Ks', ciphered with native key Ks and data DATA. For example, data DATA is the value of a counter contained in the SAM card and incremented on each personalization, or a number randomly drawn to change on each personalization. According to the illustrated embodiment, a message authentication code (MAC) is also used in this step.

The reader stores (block 22, MEM) ciphered key Ks' and transmits to card 2 data DATA by asking it to initiate a session RMAC (Response Message Authentication Code) based on these data DATA (block 22, RMAC INIT). Card 2 sends a response code RC to the reader.

The generation of key Ks' by the SAM card (block 21) is preceded (shown example) or followed by a test (block 20, COUNT VALID ?) of the state of a counter, the function of which will be described hereafter. For the time being, it should only be noted that if this test fails, the SAM card enters an error mode (ERROR) and, for example, blocks.

On reception of response code RC sent by the card, the reader forwards to card 2 the new secret key ciphered (signed) by the old key Ks and coded by the MAC (block 24, SEND Ks').

Card 2 decodes the (new) ciphered key, then deciphers it by using its native secret key. It then replaces its native key with the new secret key (block 25, REPLACE K).

It should be noted that the key crushing on the side of card 2 does not interfere with the code used for the MAC as long as the session remains valid.

Card 2 sends a code END REP to the reader, meaning that it has ended the change of secret key. The reader then sends to card 2 a request END RMAC for ending a MAC session to recover the RMAC code therefrom.

This RMAC code is transmitted to the SAM card which validates it by using data DATA that it has stored from its generation (block 30, RMAC VALID ?). If the RMAC is validated, the reader resets its key restoring function call counter (block 32, REINIT). In the opposite case, this counter remains incremented by 1.

The personalization of the current card is over. Reader-sequencer 3 waits for a new card 2 to be personalized and the process is resumed at step 10.

In a simplified embodiment, the SAM card is blocked (is unable to derive a secret key from a smart card identifier) as soon as the counter is different from 0.

In a preferred embodiment, a threshold is set for the counter before blocking the SAM card. This especially enables preserving a correct operation on occurrence of one or several (in a limited number) failing cards with which the personalization fails. The threshold is selected according to the usual manufacturing tolerances. The counter remains reset as soon as a personalization occurs normally.

On the side of card 2, the personalization control signal is only executable once since the native key is crushed by the new key.

It should be noted that the present invention is compatible with any conventional key derivation method, where the present invention does not take part in the generation of this key, but only exploits it to cipher the new key. Further, several keys may be used within a same circuit and be selected, for example, according to the application and to the user.

Of course, the present invention is likely to have various alterations, modifications, and improvements which will readily occur to those skilled in the art. In particular, the practical implementation of the present invention by a hardware or software implementation is within the abilities of those skilled in the art based on the functional indications given hereabove. Further, the selection of the number of unended personalizations acceptable before rejection of the master card is within the abilities of those skilled in the art according to the application. Further, the exploitation of a putting at fault (error) of the master card depends on the application and may, for example, correspond to a conventional blocking procedure.

Having thus described at least one illustrative embodiment of the invention, various alterations, modifications, and improvements will readily occur to those skilled in the art. Such alterations, modifications, and improvements are intended to be within the scope of the invention. Accordingly, the foregoing description is by way of example only and is not intended as limiting. The invention is limited only as defined in the following claims and the equivalents thereto.

What is claimed is:

1. A method for personalizing a plurality of electronic elements, by replacing in a non-volatile memory of each of the electronic elements in the plurality of electronic elements, a first secret key with a second secret key using a secure authentication module, said method comprising:
   generating by the secure authentication module, said second secret key after having restored the first secret key from an identifier of a current element being personalized; and
   conditioning, by at least one processor of the secure authentication module, the provision of the second key to the current element to the reception of a message from an element other than the current element confirming the key replacement of at least one preceding element other than the current element.

2. The method of claim 1, wherein exchanges between the current element and the secure authentication module are coded by data generated by said secure authentication module, wherein the data changes for each new element that is personalized.

3. The method of claim 1, wherein a same secret key of an electronic element is replaced with several second keys.

4. The method of claim 1, wherein the secure authentication module is a smart card.

5. The method of claim 1, wherein said current element is a smart card.

6. A method for personalizing electronic elements, by replacing in a non-volatile memory of each of the electronic elements, a first secret key with a second secret key, by means of a secure authentication module automatically generating said second key after having restored the first one from an identifier of the element being personalized, said method comprising:
   conditioning, on the authentication module side, the provision of the second key to a current element to the reception of a message confirming the key replacement of at least one preceding element;
   wherein a module counter totalizes the number of successive confirmation messages not received for preceding elements and compares this number with a stored threshold to allow personalization of the current element, the counter being reset each time a current element confirms the replacement of its key.

7. A system for personalizing keys in smart cards, the system comprising:
  at least one processor programmed to perform a method comprising:
    generating a second secret key after having restored a first secret key from an identifier of a current electronic element being personalized; and
    replacing, in a non-volatile memory of a current electronic element, the first secret key with the second secret key, wherein provision of the second secret key to the current electronic element is dependent on the reception of a message from an electronic element other than the current electronic element confirming the key replacement of at least one preceding element other than the current electronic element.

8. The system of claim 7, further comprising:
  a module counter configured to:
    totalize a number of successive confirmation messages not received for preceding elements; and
    compare the number with a stored threshold to allow personalization of the current element with the second secret key, the counter being reset each time a current element confirms the replacement of its key.

9. The system of claim 7, wherein the at least one processor is further programmed to:
  code information transmitted to the current electronic element with data, wherein the data changes for each new element that is personalized by the system.

10. The system of claim 9, wherein the data is a value of a counter incremented on each personalization of a new element.

11. The system of claim 9, wherein the data is a random number drawn to change on each personalization of a new element.

12. An apparatus for personalizing electronic elements by replacing in a non-volatile memory of each of the electronic elements, a first secret key with a second secret key, the apparatus comprising at least one processor implemented at least partially in hardware, the apparatus being configured to:
  automatically generate, using said at least one processor implemented at least partially in hardware, the second secret key after having restored the first secret key from an identifier of a current electronic element being personalized,
  wherein the provision of the second secret key to the current electronic element is conditioned on the reception of a message confirming the key replacement of at least one preceding electronic element other than the current electronic element; and
  wherein a module counter totalizes the number of successive confirmation messages not received for preceding electronic elements and compares this number with a stored threshold to allow personalization of the current electronic element, the counter being reset each time an electronic element confirms the replacement of its key.

13. The apparatus of claim 12, wherein the apparatus is further configured to:
  code information transmitted to the current electronic element with data, wherein the data changes for each new element that is personalized.

14. The apparatus of claim 13, wherein the data is a value of a counter incremented on each personalization of a new element.

15. The apparatus of claim 13, wherein the data is a random number drawn to change on each personalization of a new element.

* * * * *